(12) United States Patent
Choi et al.

(10) Patent No.: US 6,549,330 B1
(45) Date of Patent: Apr. 15, 2003

(54) OPTICAL GAIN FIBER DOPED WITH RARE EARTH IONS

(75) Inventors: Yong-Gyu Choi, Taejon (KR); Dong-Sung Lim, Seongnam-si (KR); Doo-Hee Cho, Taejon (KR); Kyong-Hon Kim, Taejon (KR)

(73) Assignee: Electronics and Telecommunications Research Institute (KR)

( * ) Notice: Subject to any disclaimer, the term of this patent is extended or adjusted under 35 U.S.C. 154(b) by 0 days.

(21) Appl. No.: 09/659,630

(22) Filed: Sep. 12, 2000

(30) Foreign Application Priority Data

Dec. 9, 1999 (KR) .............................. 99-56201

(51) Int. Cl.[7] .............................. H01S 3/14; H01S 3/17
(52) U.S. Cl. .............................. 359/343; 359/342; 372/6
(58) Field of Search .............................. 359/342, 343, 359/341.5, 341.1; 385/901.1; 372/6

(56) References Cited

U.S. PATENT DOCUMENTS

| 4,652,536 A | | 3/1987 | Nakajima et al. .............. 501/41 |
| 5,251,062 A | | 10/1993 | Snitzer et al. .............. 359/341 |
| 5,668,659 A | * | 9/1997 | Sakamoto et al. .......... 359/341 |
| 6,181,465 B1 | * | 1/2001 | Grubb et al. ................ 359/337 |
| 6,198,870 B1 | * | 3/2001 | Kubota et al. .............. 385/142 |

OTHER PUBLICATIONS

Optical Materials, Tellurite Glass: A New Candidate for Fiber Devices, 3 (1994), pp. 187–203.
IEEE Photonics Technology Letters, vol. 8, No. 3, Mar. 1996.
IEEE Photonics Technology Letters, vol. 7, No. 9, Sep. 1995.
Y.G. Choi et al., Journal of Non–Crystalline Solids 000 (2000), pp. 1–7.
Sakamoto et al. "1.4–mu m –Band Gain Characteristics of a Tm–Ho–Doped Zblyan Fiber Amplifier Pumped in the 0.8–mu m Band." Sep. 1995. IEEE Photonics Tech. Lett. vol. 7, No. 9 pp. 983–985.*
Hewak, D.W. "Progress towards a 1300 nm fiber amplifier" IEE. Nov. 2, 1998 pp. 12/1–12/5.*
Tanabe et al. Optics Letters Jun. 1, 2000 vol. 25, No. 11.*
Tanabe et al. Physical Review vol. 47, No. 5 Feb. 1993.*
Tanabe et al. J. Opt. Soc. Am. vol. 11, No. 5 May 1994.*
Tanabe et al. Optical Materials vol. 12 1999.*
Tanabe et al. Physical Teview vol. 53 No. 13 Apr. 1, 1996.*
Mori et al. Electronics Letters May 8, 1997 vol. 33 No. 10.*
Komukai et al. IEEE J. of Q. Elecronics vol. 31, No. 11, Nov. 1995.*

* cited by examiner

Primary Examiner—Thomas G. Black
Assistant Examiner—Stephen Cunningham
(74) Attorney, Agent, or Firm—Blakely Sokoloff Taylor & Zafman

(57) ABSTRACT

An optical gain fiber of the present invention is doped with rare earth ions for improving a gain efficiency of a certain transition of the rare earth ions by inhibiting an undesirable amplified spontaneous emission. The optical gain fiber for amplifying an optical signal, includes a core doped with a first rare-earth ion in a portion thereof for amplifying the optical signal, and a clad doped with a second rare earth ion for absorbing an undesirable amplified spontaneous emission (ASE) emitted from the first rare earth ion, wherein the portion of the core and the potion of the clad are separated by the remaining portions of the core and the clad.

11 Claims, 6 Drawing Sheets

OPTICAL GAIN FIBER DOPED WITH RARE EARTH IONS

FIELD OF THE INVENTION

The present invention relates to an optical gain fiber; and, more particularly, to an optical gain fiber doped with rare earth ions for improving gain efficiency thereof.

DESCRIPTION OF THE PRIOR ART

As a thulium ion, usefully used in an optical communication, is an active ion excited easily by a laser diode in common use, a thulium-doped optical amplifier is implemented by using a fluorescence generated from a transition of a thulium ion. To obtain a high gain in 1.4 $\mu$m band by using the thulium-doped optical amplifier, many researches for fluoride glass and tellurite glass are being advanced.

In the optical gain fiber amplifier using the near-infrared fluorescence in 1.4 $\mu$m band generated from a thulium-doped ($Tm^{3+}$, ) amorphous material, the fluorescence in a 800 nm band, in 1,450 nm band and in 2,300 nm band are emitted simultaneously from a $^3H_4$ level which absorbs a photon energy in 800 nm band. In this case, the intensity of the fluorescence is considerably affected by a branching ratio. The branching ratio of the 1,4 $\mu$m band is lower approximately 10% than the fluorescence in 800 nm band, whereby most of electrons, excited to the $^3H_4$ level, are transited to a $^3H_6$ level in emitting the fluorescence in 800 nm band. Therefore, the efficiency of an amplification in 1.4 $\mu$m band, is decreased in the thulium-doped amplifier owing to an amplified spontaneous emission (ASE) or lasing of the fluorescence in the 800 nm band.

As is well known, an optical amplifier has become a major device not only for constructing an optical transmission system, but also for implementing an optical network. Hence, various fiber amplifiers have been developed for the transmission windows of the conventional single mode silica fibers ranging from 1.2 ~1.6 $\mu$m.

With regard to the 1.4 $\mu$m band, thulium ($Tm^{3+}$)-doped fiber amplifiers have been proposed, based on the stimulated transition from $^3H_4$ (upper level) to $^3F_4$ (lower level). The amplification of these $Tm^{3+}$-doped fiber amplifiers is limited by the fact that the lifetime of the upper level is shorter than that of the lower level, which results in a difficulty in forming a population inversion. Therefore, the lower level needs to be depopulated to construct an efficient amplifier with $Tm^{3+}$-doped fibers.

Recently, several methods have been proposed for depopulating the $Tm^{3+}$ lower level.

One of these methods is that holmium ions ($Ho^{3+}$) have been proposed as effective codopant ions. By codoping $Ho^{3+}$ ions with $Tm^{3+}$ ions in a core of an optical gain fiber, the lower level of $Tm^{3+}$ is depopulated through the energy transfer process. $Ho^{3+}$ ions depopulate the lower level effectively, and do not depopulate the upper level of $Tm^{3+}$, very much by cross relaxation, so efficient amplification can be expected.

However, the above-described method still has a problem of an amplified spontaneous emission (ASE), arising from the 800 nm transition of $Tm^{3+}$.

SUMMARY OF THE INVENTION

It is, therefore, an object of the present invention to provide an optical gain fiber doped with rare earth ions for improving a gain efficiency of a fiber amplifier operating at the 1,450 nm band by inhibiting an amplified spontaneous emission at 800 nm.

In accordance with one aspect of the present invention, there is provided an optical gain fiber for amplifying an optical signal, comprising: a core doped with a first rare-earth ion in a portion thereof for amplifying the optical signal; and a clad doped with a second rare earth ion for absorbing an amplified spontaneous emission (ASE) emitted from the first rare earth ion, wherein the portion of the core and the potion of the clad are separated by the remaining portions of the core and the clad.

BRIEF DESCRIPTION OF THE DRAWINGS

The above and other objects and features of the present invention will become apparent from the following description of a preferred embodiment given in conjunction with the accompanying drawings, in which.

DETAILED DESCRIPTION OF THE PREFERRED EMBODIMENTS

Figure 1:
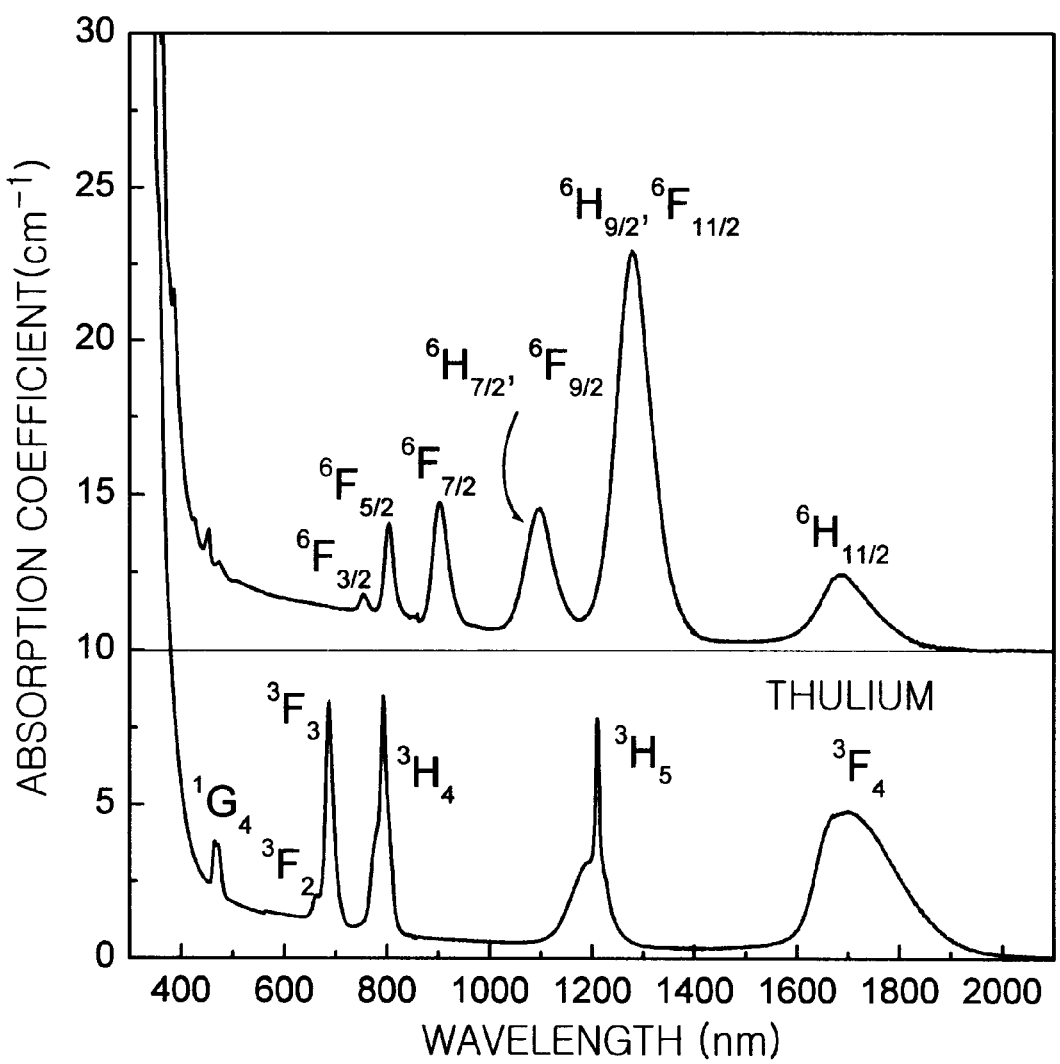
FIG. 1 is absorption spectrum data of thulium ($Tm^{3+}$) and dysprosium ($Dy^{3+}$)

The present invention provides an optical gain fiber including a core doped with a thulium ion ($Tm^{3+}$,) in a central region thereof, a clad enclosing the core, and an energy absorption ion layer separated from the thulium ion layer for absorbing fluorescence caused by a transition from $^3H_4$ to $^3H_6$.

The energy absorption ion layer, placed in the core or clad, can be made of a dysprosium ion, a neodymium ion and a combination thereof. The distance between the thulium ion layer and the energy absorption ion layer is 20 nm at least.

In the thulium-doped optical gain fiber amplifier, wherein optical gains are produced in 1,450 nm band, the gain saturation is occurred owing to an amplified spontaneous emission (ASE) generated in 800 nm band. To prevent this phenomenon, the dysprosium ion or the neodymium ion is used in the thulium-doped optical gain fiber, which has the characteristics of absorbing the fluorescence in 800 nm band and not absorbing the fluorescence in 1,450 nm band.

In the structure of the optical gain fiber in accordance with the preferred embodiment of the present invention, the dysprosium ion or the neodymium ion layer encloses the thulium-doped layer and absorbs photons in 800 nm band generated from the transition of the thulium ion. At this time, there should be no change in a fluorescence lifetime of an energy level, in which the fluorescence in 800 nm band is emitted. For satisfying this condition, the energy absorption ion layer should be separated from the thulium ion layer at a distance in order to generate a radiative energy transfer, and to inhibit a non-radiative energy transfer. That is, since the distance, which the non-radiative energy transfer is generated actively, is of approximately several or tens of nm, each ion layer should be separated over than the distance described above to absorb the fluorescence in 800 nm band.

Why the thulium ion layer and the dysprosium ion or the neodymium ion layer should be separated at a distance is illustrated in more detail hereinafter.

The non-radiative energy transfer easily occurs when the distance between the ions is close, that is, when the ions are co-doped. The magnitude of the non-radiative energy transfer is inversely proportional to six times multiplication of the distance between the ions. Whereas, in the radiative energy transfer, the emitted fluorescence is absorbed again while traveling, and the magnitude is inversely proportional to two times multiplication of the distance between the ions. Therefore, when the distance between the ions is longer, the effect of the non-radiative energy transfer is rapidly decreased and that of the radiative energy transfer is dominant. The common point of two energy transfers is that those energy transfers are likely to be generated when the condition of the energy resonance is satisfied, e.g., the energy of emission and that of the absorption are same. Note that some energy mismatches are allowed through the phonon-assisted energy transfer. Whereas, the different point is that a fluorescence lifetime of the fluorescing level is decreased and there is no change of the emission spectrum of the emitted spectrum in the non-radiative energy transfer, and the spectrum of the fluorescence emission is changed according to the absorption spectrum of the energy accepting ion in the radiative energy transfer while the fluorescence lifetime is not changed. Therefore, not to decrease the fluorescence lifetime of the thulium ion and to change the shape of the emission spectrum, the generation of the non-radiative energy transfer should be inhibited and the radiative energy transfer should be promoted. For satisfying this, the thulium ion layer and the energy absorption ion layer should be separated at a distance.

Furthermore, the energy absorption ion layer of a rare earth ion used in the structure of the optical gain fiber in accordance with the present invention should satisfy the following conditions. First, it has the ground state absorption in 800 nm band. Second, the absorption is not occurred in 1,450 nm band. And third, it is appropriate for the absorbed energy to be released in the non-radiative way. This means that the absorbed energy is supposed to be relaxed in the non-radiative multiphonon relaxation mechanism by a host material due to a tightly spaced energy gap between the energy levels. The dysprosium ion satisfies those conditions. But, in the neodymium ion, although the absorption is occurred in 800 nm band and not in 1,450 nm band, the fluorescence generated by the transition can be occurred owing to the wide gap between the energy levels. However, the wavelength of this fluorescence does not exist in 1,450 nm band either.

To certificate the possibility of a radiative energy transfer between arbitrary ions, two methods are used as followings.

Figure 2:
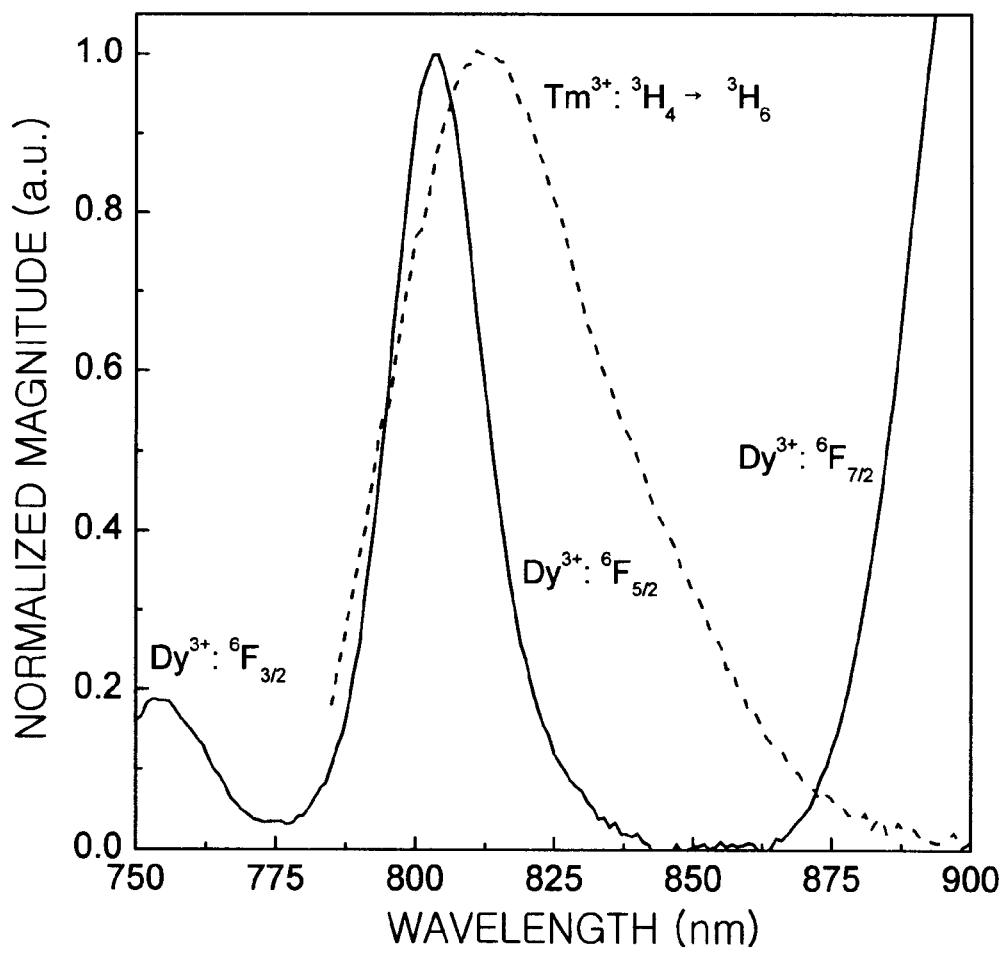
FIG. 2 shows a graph for comparing a fluorescence property of $Tm^{3+}$ with an absorption property of $Dy^{3+}$ in 800 nm band.

The first is to compare the shape and the wavelength of the fluorescence emission spectrum with those of the absorption spectrum. FIG. 1 is the absorption spectrum of the rare-earth ion in accordance with the preferred embodiment of the present invention, measuring on condition that each 4 mol. % of thulium and dysprosium ion is added into the tellurite glass, e.g., $75TeO_2—25ZnO—5Na_2O$. The gap between the absorbed energy levels of dysprosium ion is narrow as shown in FIG. 1. And an absorption peak is occurred also in about 2,700 nm band, although that is not shown in FIG. 1. This means that when $Tm^{3+}$ and $Dy^{3+}$ are codoped into the fluoride and tellurite glasses, the quantum efficiency, due to the multiphonon relaxation mechanism, should be low. In accordance with the embodiment of the present invention, only the tellurite glass is used for a substrate glass, but the fluoride glass may be used for the substrate glass also. Referring to FIG. 2, there is shown the fluorescence spectrum of the thulium ion and the absorption spectrum of the dysprosium ion in 800 nm band. In these spectra, the emission spectrum and absorption spectrum is overlapped each other in a particular range, i.e., approximately in 800 nm range. This illustrates the fluorescence in 800 nm band emitted from the thulium ion can be absorbed effectively by the dysprosium ion.

Figure 3:
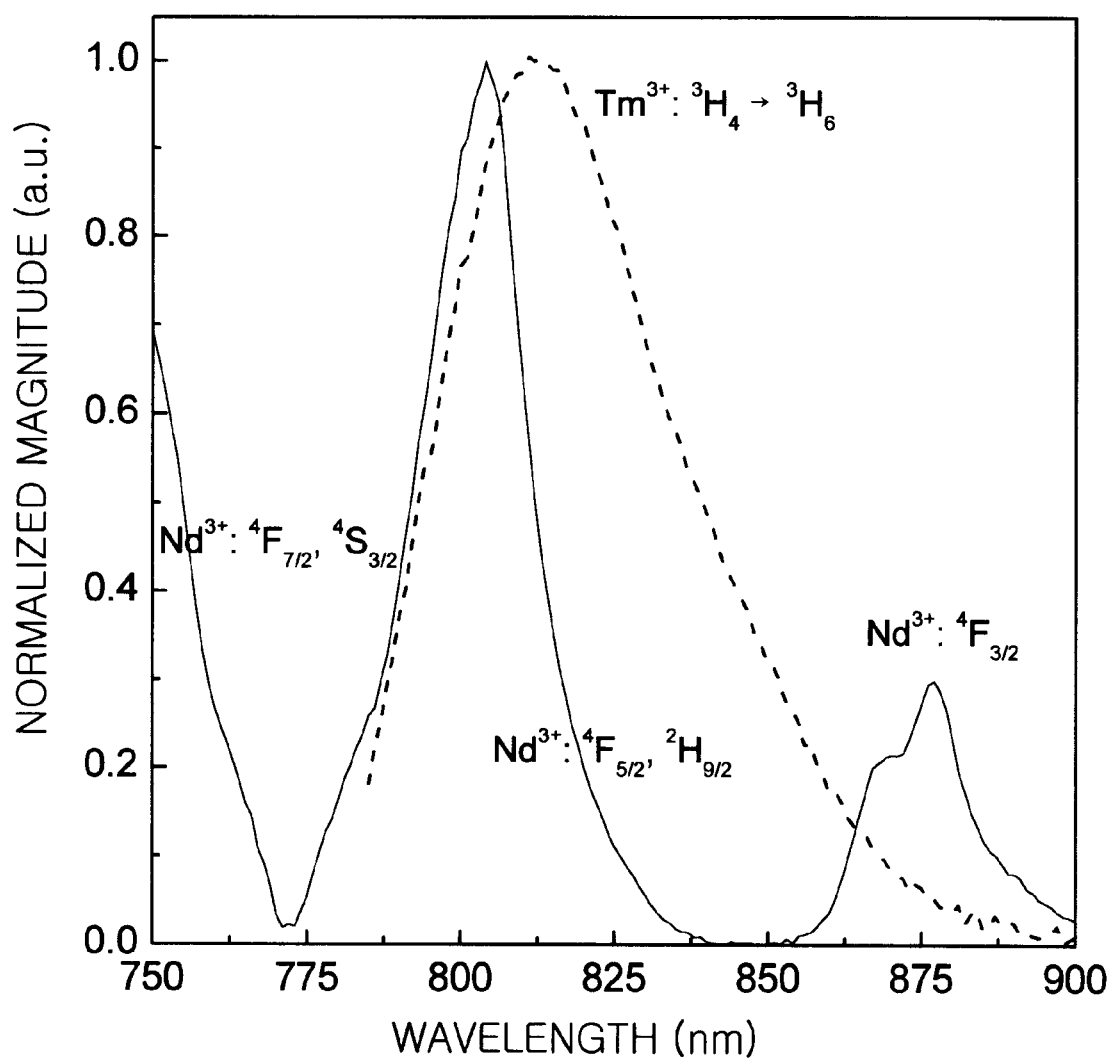
FIG. 3 represents a graph for comparing a fluorescence property of $Tm^{3+}$ with an absorption property of $Nd^{3+}$ in 800 nm band.

Further referring to FIG. 3, there is a graph comparing the fluorescence spectrum of the thulium ion and the absorption spectrum of the neodymium ion in 800 nm band. This result is similar to that of the dysprosium ion, whereby the neodymium ion also can be used instead of the dysprosium ion for re-absorbing the ASE arising from the 800 nm transition of the thulium ion.

The second method is to measure the change of an amplified spontaneous emission (ASE) of the thulium ion in various wavelengths range by adding the dysprosium ion. To do this, in the present invention, the dysprosium ion-doped sample is placed between the sample of the thulium ion being added solely, and the slit of the monochromator. In this method, the non-radiative energy transfer between the thulium and the dysprosium ions is inhibited, whereby the effect of the radiative energy transfer can be measured entirely. Another method for confirmation of the radiative energy transfer is to use a composite glass sample where two single-doped glass panels are tightly bonded each other. However, in practice, the fluorescence lifetime of the thulium ion is measured to be unchanged regardless of the dysprosium ion. In case of the present invention, the distance between the thulium and the dysprosium ions is sufficiently long and the relative amount of two ions are not optimized, so that the change of the fluorescence spectrum is not occurred. But, if the distance is close and the concentrations of two ions are optimized, the effect is evidently occurred.

Figure 4:
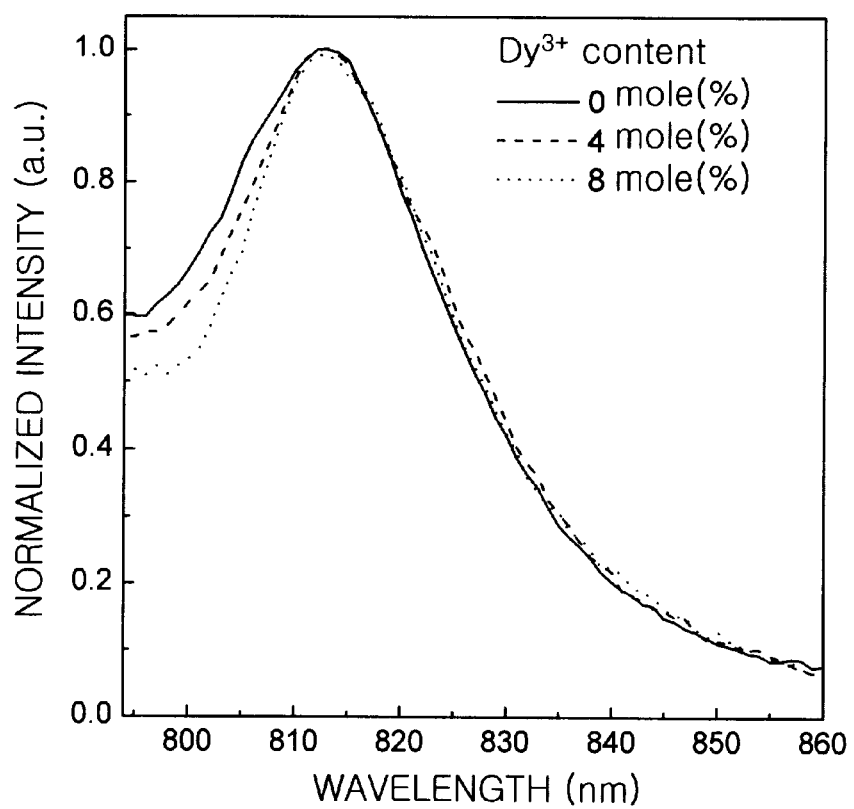
FIG. 4 depicts a graph of a change of the fluorescence property of $Tm^{3+}$ in 800 nm band by adding $Dy^{3+}$.

Referring to the FIG. 4, there is shown the change of the fluorescence spectrum in 800 nm band by adding the dysprosium ion. The result shows that the florescent intensity in 800 nm band generated from the thulium ion,o is decreased as the concentration of the dysprosium ion is increased.

Figure 5:
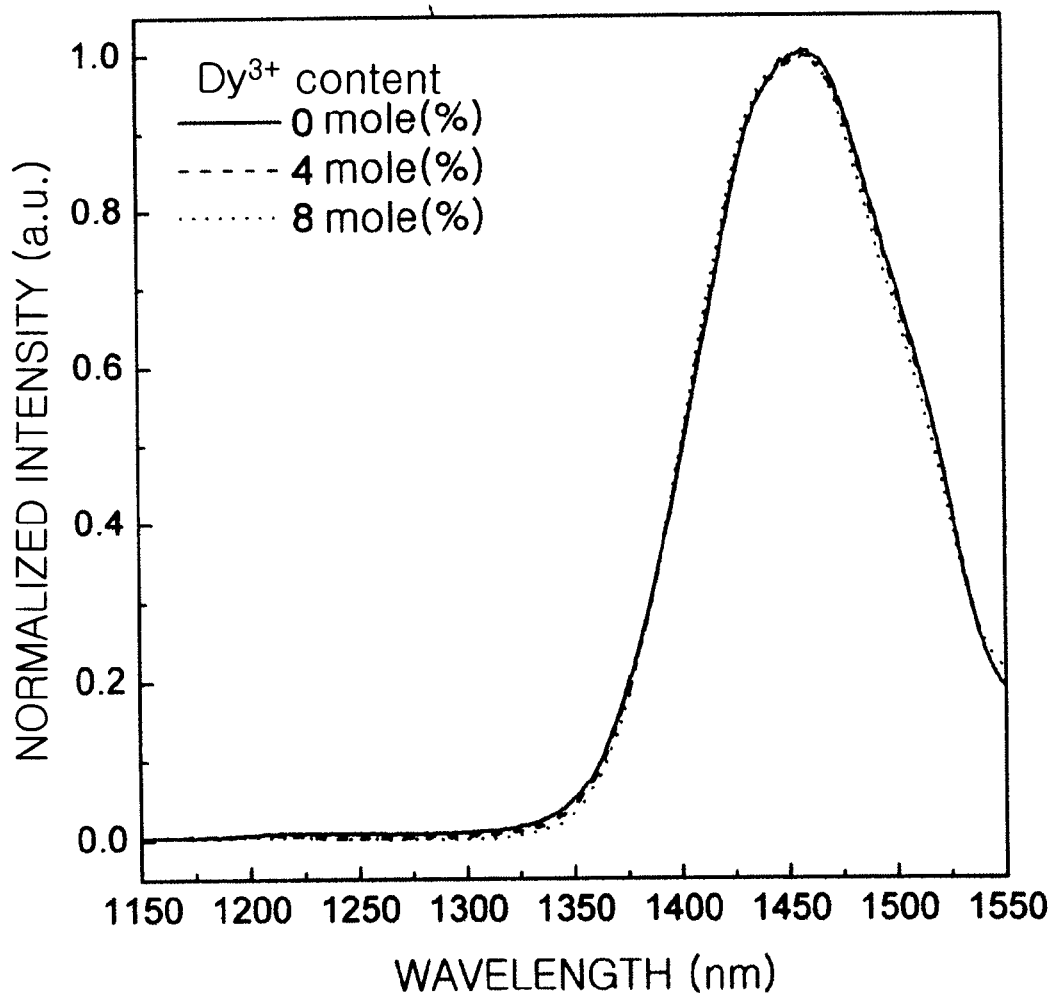
FIG. 5 illustrates a graph of a change of the fluorescence property of $Tm^{3+}$ in 1,400 nm band by adding $Dy^{3+}$.

Referring to the FIG. 5, there is shown the change of the fluorescence spectrum in 1,400 nm band by adding the dysprosium ion. In 1,450 nm band, the fluorescence spectrum is not affected even if the dysprosium ion is added.

As described above, the phenomenon of the energy transfer between two-rare earth ions can be applied to the thulium-doped optical gain fiber amplifier, wherein gains are obtained in 1,450 nm band. Concretely, the dysprosium ion or the neodymium ion layer is formed at a distance from the thulium ion layer in the core. In this case, the distance between the two layers should be apart sufficiently to inhibit the non-radiative energy transfer as mentioned already. Since the non-radiative energy transfer is occurred when the two ions are separated by tens of nm, it is possible to decrease the effect of the non-radiative energy transfer if the distance between two ion layers is over than 20 nm. In this way, if the dysprosium or neodymium ion layer is formed around the core, the fluorescence in 800 nm band is absorbed continuously through the entire length of the optical gain fiber. Therefore, it is possible to reduce the unnecessary excitation energy by inhibiting the ASE effectively than the case of using the filter. Besides, the saturation of gains is relieved by means of inhibiting the lasing phenomenon occurred in 800 nm band even if the excitation energy is increased.

Figure 6:
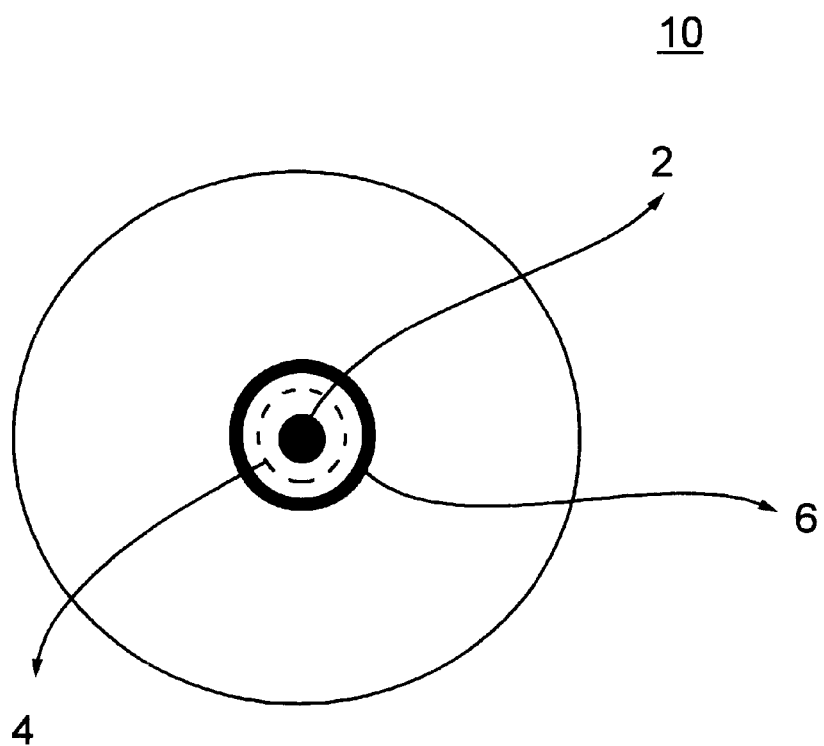
FIG. 6 is a cross-sectional view of an optical gain fiber in accordance with a preferred embodiment of the present invention, wherein $Tm^{3+}$ and $Dy^{3+}$ are doped in a core and a clad of the optical gain fiber, respectively.

The dysprosium ion layer can be placed either in the core or in the clad of the optical gain fiber. Referring to FIG. 6, there is represented the cross-sectional view of the optical gain fiber 10 in accordance with the preferred embodiment of the present invention, wherein the thulium ion 2 is doped in the core and the dysprosium ion 6 is doped in the clad and the boundary 4 of two layers is disposed between the core and the clad. Furthermore, there is suggested that the advanced optical gain fiber of the present invention can be used in the optical gain fiber amplifier and the optical gain fiber laser in 1.4 $\mu$m band, wherein the optical fiber includes the thulium ion for lasing and amplifying is doped in the core and the dysprosium or the neodymium ion layer separated from the thulium ion at a distance is doped in the clad as mentioned already.

The amount of the dysprosium ion or the neodymium ion is determined by the following criteria. In the first case that the absorption rare-earth ion is doped in the core, the additive amount is determined proportional to the amount of the thulium ion and is inversely proportional to the confinement factor of the propagating light in 800 nm band. And in the second case that the absorption rare-earth ion is doped in the clad, the additive amount is determined proportional to the concentration of the thulium ion and the confinement factor. However, an accurate proportional constant can be determined experimentally.

While the present invention has been described with respect to a certain preferred embodiment only, other modifications and variations may be made without departing from the spirit and scope of the present invention as set forth in the following claims.

What is claimed is:

1. An optical gain fiber for amplifying an optical signal, comprising:

a core doped with a first rare-earth ion operating at 1460 nm band in a portion thereof for amplifying the optical signal; and a clad doped with a second rare-earth ion for absorbing an amplified spontaneous emission (ASE) emitted from the first rare-earth ion at 800 nm, wherein the portion of the core and the portion of the clad are separated by the remained portion of the core and the clad.

2. The optical gain fiber of claim 1, wherein the core further includes the second rare earth ion.

3. The optical gain fiber of claim 2, wherein the second rare earth ion is made of dysprosium (Dy).

4. The optical gain fiber of claim 1, wherein the core and the clad is made of a tellurite glass or a fluoride glass.

5. The optical gain fiber of claim 1, wherein the first rare earth ion is thulium (Tm).

6. The optical gain fiber of claim 1, wherein the second rare earth ion is selected from the group consisting of dysprosium (Dy), neodymium (Nd) or a combination thereof.

7. The optical gain fiber of claim 1, wherein the first optical signal is in 1.4 $\mu$m band.

8. The optical gain fiber of claim 1, wherein the ASE is at 0.8 $\mu$m band.

9. The optical gain fiber of claim 1, wherein the portion of the core is in a form of wire.

10. The optical gain fiber of claim 1, wherein the portion of the clad is in a form of a hollow cylinder.

11. The optical gain fiber of claim 1, wherein a distance between the first rare earth-doped portion and the second rare earth-doped portion is approximately 20 nm at least.

* * * * *